(12) United States Patent
Strock et al.

(10) Patent No.: US 9,169,740 B2
(45) Date of Patent: *Oct. 27, 2015

(54) FRIABLE CERAMIC ROTOR SHAFT ABRASIVE COATING

(75) Inventors: Christopher W. Strock, Kennebunk, ME (US); Paul H. Zajchowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 1025 days.

This patent is subject to a terminal disclaimer.

(21) Appl. No.: 12/910,966

(22) Filed: Oct. 25, 2010

(65) Prior Publication Data

US 2012/0099970 A1  Apr. 26, 2012

(51) Int. Cl.
*F01D 5/20* (2006.01)
*F01D 11/08* (2006.01)
*F04D 29/08* (2006.01)
*F01D 11/12* (2006.01)
*F01D 5/06* (2006.01)
*F01D 5/28* (2006.01)

(52) U.S. Cl.
CPC ............... *F01D 11/122* (2013.01); *F01D 5/06* (2013.01); *F01D 5/288* (2013.01); *F05C 2203/0839* (2013.01); *F05D 2230/90* (2013.01); *F05D 2240/20* (2013.01); *F05D 2240/60* (2013.01); *F05D 2300/611* (2013.01); *Y02T 50/67* (2013.01); *Y02T 50/672* (2013.01); *Y02T 50/673* (2013.01)

(58) Field of Classification Search
CPC ............. F01D 5/06; F01D 5/288; F01D 5/20; F01D 11/122; F01D 11/12; F05C 2203/0839
USPC .................. 415/173.4, 174.4, 173.1; 416/174
See application file for complete search history.

(56) References Cited

U.S. PATENT DOCUMENTS

| | | | |
|---|---|---|---|
| 4,227,703 A | 10/1980 | Stalker et al. | |
| 4,238,170 A | 12/1980 | Robideau et al. | |
| 4,588,607 A | 5/1986 | Matarese et al. | |
| 4,783,341 A | 11/1988 | Packer et al. | |
| 4,861,618 A | 8/1989 | Vine et al. | |
| 4,884,820 A | 12/1989 | Jackson et al. | |
| 4,936,745 A | 6/1990 | Vine et al. | |
| 5,113,582 A | 5/1992 | Monson et al. | |
| 5,434,210 A | 7/1995 | Rangaswamy et al. | |
| 5,536,022 A | 7/1996 | Sileo et al. | |
| 5,562,404 A | 10/1996 | Koff et al. | |
| 5,645,399 A | 7/1997 | Angus | |

(Continued)

FOREIGN PATENT DOCUMENTS

EP    1865150 A1    12/2007
WO    WO2008135803 A1    11/2008

OTHER PUBLICATIONS

European Search Report, mailed Jan. 9, 2012.

(Continued)

*Primary Examiner* — Edward Look
*Assistant Examiner* — Christopher J Hargitt
(74) *Attorney, Agent, or Firm* — Kinney & Lange, P.A.

(57) ABSTRACT

An abrasive coating on a rotor shaft interacts with cantilevered vanes to form an abradable air seal in a turbine engine. The abrasive coating includes a metal bond coat, and an abrasive layer containing a plurality of abrasive CBN grit particles in a ceramic matrix.

25 Claims, 3 Drawing Sheets

(56) References Cited

U.S. PATENT DOCUMENTS

| | | | |
|---|---|---|---|
| 5,704,759 A * | 1/1998 | Draskovich et al. | 415/170.1 |
| 5,705,231 A | 1/1998 | Nissley et al. | |
| 5,715,596 A | 2/1998 | Bintz | |
| 5,780,116 A | 7/1998 | Sileo et al. | |
| 5,780,171 A | 7/1998 | Nissley et al. | |
| 5,879,753 A | 3/1999 | Zajchowski et al. | |
| 5,950,308 A | 9/1999 | Koff et al. | |
| 5,993,976 A * | 11/1999 | Sahoo et al. | 428/472 |
| 6,004,362 A * | 12/1999 | Seals et al. | 51/295 |
| 6,089,825 A | 7/2000 | Walden et al. | |
| 6,102,656 A | 8/2000 | Nissley et al. | |
| 6,177,174 B1 | 1/2001 | Legrand | |
| 6,190,124 B1 * | 2/2001 | Freling et al. | 415/173.4 |
| 6,358,002 B1 | 3/2002 | Good et al. | |
| 6,383,658 B1 | 5/2002 | Carlson et al. | |
| 6,537,021 B2 | 3/2003 | Howard et al. | |
| 6,703,137 B2 | 3/2004 | Subramanian | |
| 7,241,108 B2 * | 7/2007 | Lewis | 415/173.4 |
| 7,407,369 B2 | 8/2008 | Schwarz et al. | |
| 7,510,370 B2 * | 3/2009 | Strangman et al. | 415/173.4 |
| 2003/0132119 A1 * | 7/2003 | Ohara et al. | 205/109 |
| 2004/0005452 A1 | 1/2004 | Dorfman et al. | |
| 2006/0140756 A1 | 6/2006 | Schwarz et al. | |
| 2008/0063520 A1 | 3/2008 | Baumann et al. | |
| 2008/0087023 A1 | 4/2008 | Suciu et al. | |
| 2008/0145649 A1 | 6/2008 | Mannem et al. | |
| 2008/0219835 A1 | 9/2008 | Freling et al. | |
| 2008/0226879 A1 | 9/2008 | Strock et al. | |
| 2009/0017260 A1 | 1/2009 | Kulkarni et al. | |
| 2009/0097970 A1 | 4/2009 | Tholen et al. | |
| 2009/0136740 A1 | 5/2009 | Reynolds et al. | |
| 2010/0098923 A1 | 4/2010 | Freling et al. | |
| 2010/0143103 A1 | 6/2010 | Sellars et al. | |

OTHER PUBLICATIONS

Article entitled "On the Potential of Metal and Ceramic Based Abradables in Turbine Seal Applications", Proceedings of the Thirty-Sixth Turbomachinery Symposium—2007, Dieter Sporer et al., pp. 79-86.

Article entitled "Increased Efficiency of Gas Turbines", New High-Temperature Seal System, Sulzer Technical Review Feb. 2008, Dieter Sporer et al., pp. 1-4.

* cited by examiner

FRIABLE CERAMIC ROTOR SHAFT ABRASIVE COATING

CROSS-REFERENCE TO RELATED APPLICATIONS

This application is related to the following co-pending applications that are filed on even date herewith and are assigned to the same assignee: ABRASIVE ROTOR COATING FOR FORMING A SEAL IN A GAS TURBINE ENGINE, Ser. No. 12/910,989; ROUGH DENSE CERAMIC SEALING SURFACE IN TURBOMACHINES, Ser. No. 12/910,973; THERMAL SPRAY COATING PROCESS FOR COMPRESSOR SHAFTS, Ser. No. 12/910,994; ABRASIVE ROTOR SHAFT CERAMIC COATING, Ser. No. 12/910,960; ABRASIVE CUTTER FORMED BY THERMAL SPRAY AND POST TREATMENT, Ser. No. 12/911,004; and SELF DRESSING, MILDLY ABRASIVE COATING FOR CLEARANCE CONTROL, Ser. No. 12/910,954. The disclosures of these applications are incorporated herein by reference in their entirety.

BACKGROUND

Gas turbine engines include compressor rotors with a plurality of rotating compressor blades. Minimizing the leakage of air between tips of the compressor blades and a casing of the gas turbine engine increases the efficiency of the gas turbine engine as the leakage of air over the tips of the compressor blades can cause aerodynamic efficiency losses. To minimize leakage, the gap at tips of the compressor blades is set so small that at certain conditions, the blade tips may rub against and engage an abradable seal on the casing of the gas turbine. The abradability of the seal material prevents damage to the blades while the seal material itself wears to generate an optimized mating surface and thus reduce the leakage of air.

Cantilevered vanes that seal against a rotor shaft are also used for elimination of the air leakage in turbine engines. Current cantilevered vane tip sealing requires that the tip gaps need to be set more open than desired in order to prevent rub interactions that can cause rotor shaft spallation, vane damage or rotor shaft burn through caused by thermal runaway events during rubs. Current materials have been shown to lack the durability to prevent spallation and they lack the abradability to prevent vane damage.

SUMMARY

The present invention is an abrasive coating that comprises a low strength, abrasive composite top layer on a bond coat. The top layer contains sharp abrasive cubic boron nitride (CBN) grits held in a composite matrix of yttria stabilized zirconia, gadolinia-zirconate, hafnia, mullite or alumina that is produced by thermal spray of the ceramic particles. Also included is a quantity of hexagonal boron nitride (hBN). A base bond coat may be MCr, MCrAl, MCrAlY or a refractory modified MCrAlY, where M is nickel, cobalt, iron or mixtures thereof.

When added thermal protection is needed, the coating may also include an intermediate layer between the abrasive composite top layer and the bond coat. The intermediate layer comprises a ceramic layer that acts as a thermal barrier to protect the rotor shaft. Ceramic layers include zirconia, hafnia, mullite, and alumina.

DETAILED DESCRIPTION

Figure 1:
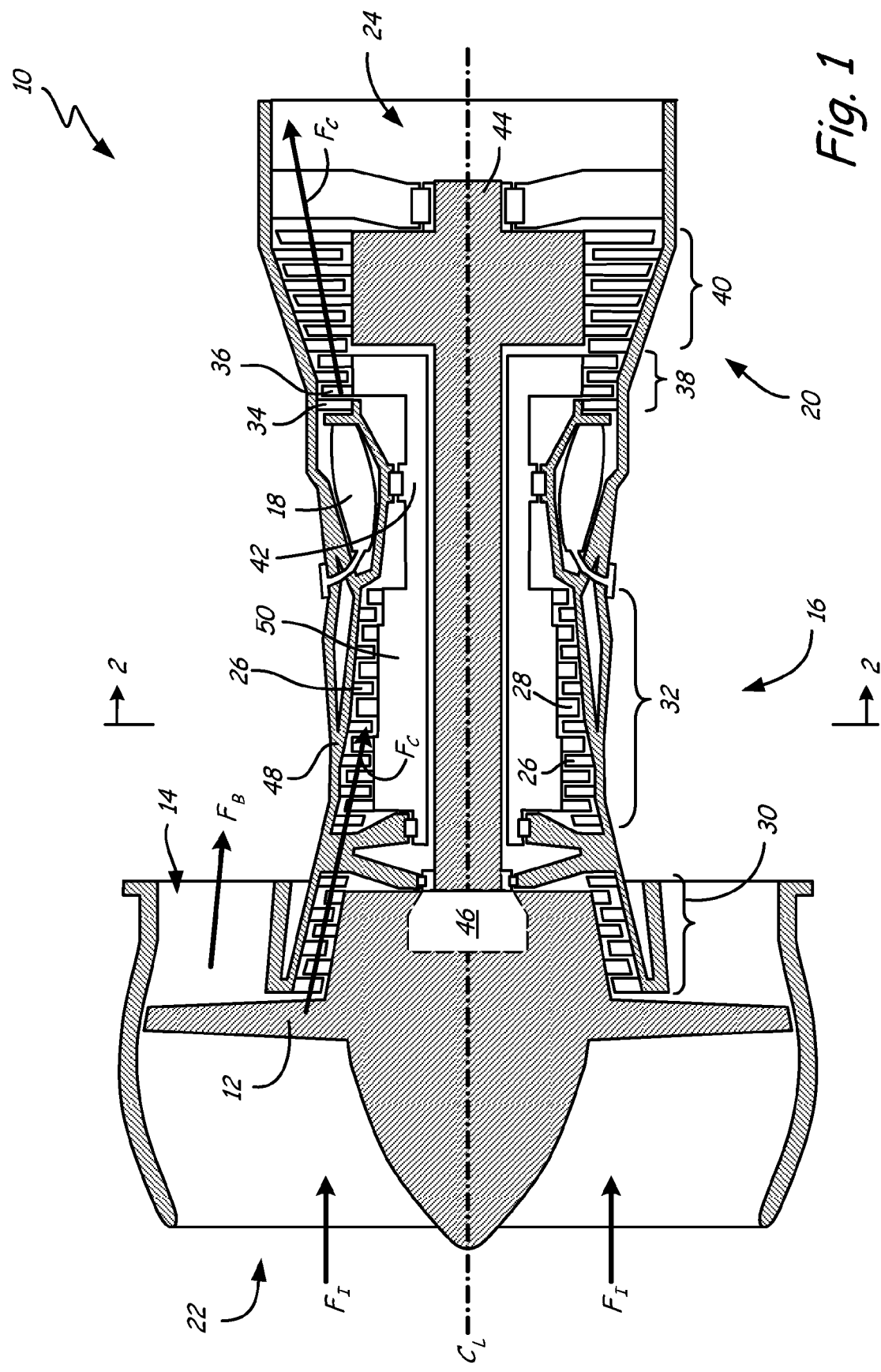
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 50, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly) to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_1$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow $F_C$, and LPC section 30 may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 50, driving HPC section 32 of compressor 16 via HPT shaft 50. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
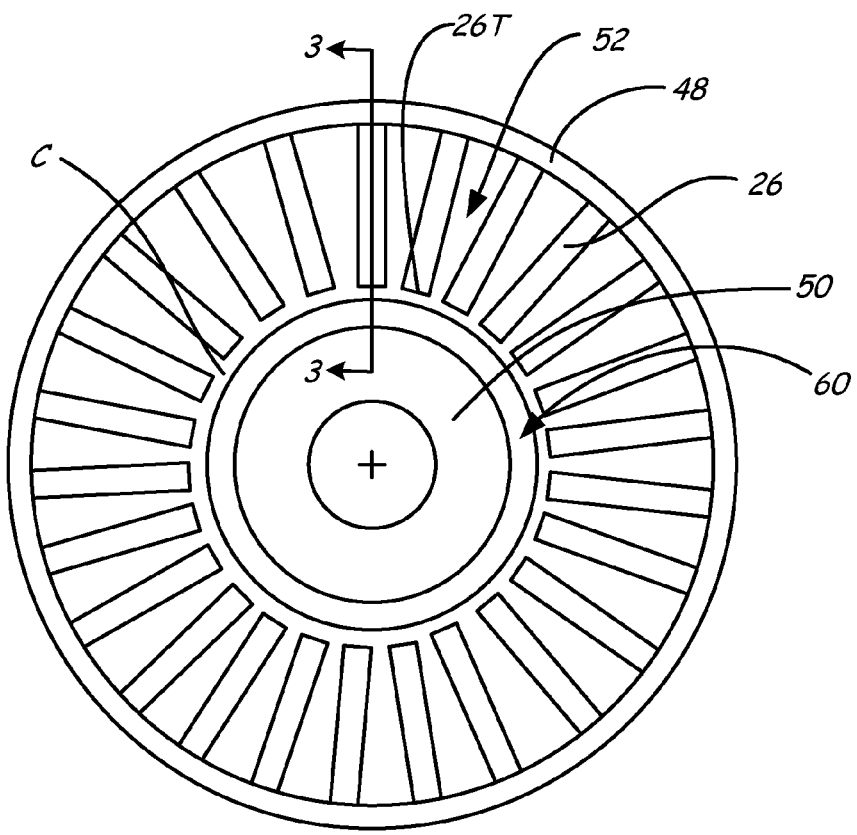
FIG. 2 illustrates a simplified cross sectional view of a rotor shaft inside a casing illustrating the relationship of the rotor and cantilevered vanes taken along the line 2-2 of FIG. 1, not to scale.
Figure 3:
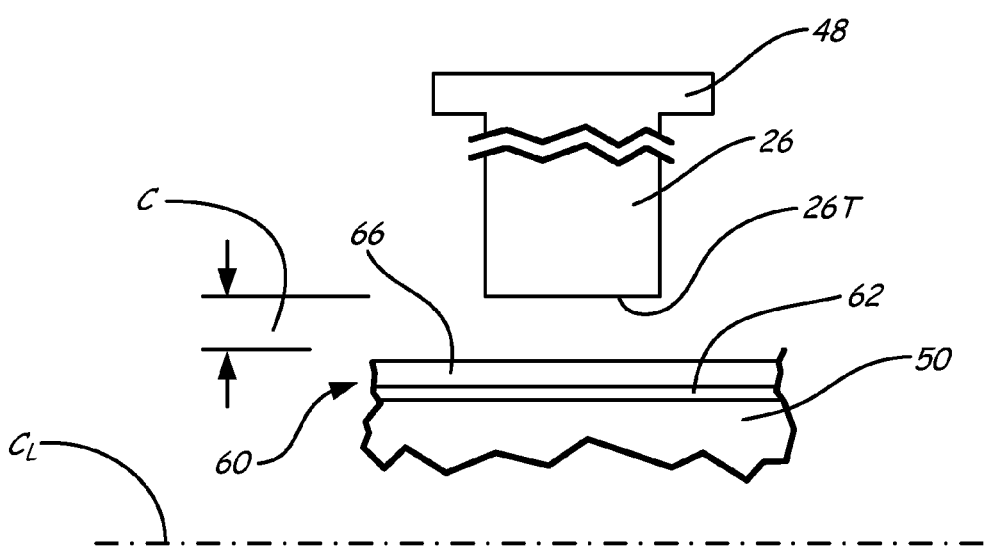
FIG. 3 is a cross sectional view taken along the line 3-3 of FIG. 2, not to scale.

FIG. 2 is a cross section along line 2-2 of FIG. 1 of a casing 48 which has a rotor shaft 50 inside. Vanes 26 are attached to casing 48 and the gas path 52 is shown as the space between vanes 26. Coating 60, corresponding to the coating of this invention, is on rotor shaft 50 such that the clearance C between coating 60 and vane tips 26T of vanes 26 has the proper tolerance for operation of the engine, e.g., to serve as a seal to prevent leakage of air (thus reducing efficiency), while not interfering with relative movement of the vanes and rotor shaft. In FIGS. 2 and 3, clearance C is expanded for purposes of illustration. In practice, clearance C may be, for example, in a range of about 0.025 inches to 0.055 inches when the engine is cold and 0.000 to 0.035 inches during engine operation, depending on the specific operating conditions and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 that varies with operating conditions, as described herein.

FIG. 3 shows an embodiment comprising bi-layer coating 60 in which includes metallic bond coat 62 and abradable layer 66. Metallic bond coat 62 is applied to rotor shaft 50. Abrasive layer 66 is deposited on top of bond coat 62 and is the layer that first encounters vane tip 26T.

Bond coat 62 is thin, up to 10 mils, more specifically ranging from about 3 mils to about 7 mils (about 76 to about 178 microns). Abrasive coating 66 is about the same thickness as bond coat 62, again ranging from about 3 mils to about 7 mils (about 76 to about 178 microns).

Bond coat 62 may be formed of MCrAlY, the metal (M) can be nickel, iron, or cobalt, or combinations thereof and the alloying elements are chromium (Cr), aluminum (Al) and yttrium (Y). For example, bond coat 62 may be 15-40%, Cr 6-15% Al, 0.61-1.0% Y and the balance is cobalt, nickel or iron and combinations thereof. It is applied in a conventional air plasma spray process.

Top abrasive layer 66 thickness is about the same as bond coat layer 62, ranging from about 3 mils to about 7 mils (about 76 to about 178 microns). Abrasive layer 66 is formed from cubic boron nitride (CBN) grit particles contained in a low strength abrasive matrix. The matrix holding the CBN grit particles may be a ceramic matrix of hexagonal boron nitride (hBN) in yttria stabilized zirconia or gadolinia-zirconate that is produced by thermal spray of ceramic particles. The amount of CBN grit particles ranges from about 1% to about 5%, based on the volume of the coating. The amount of hBN ranges from about 5% to about 60%, based on the volume of the coating. To facilitate thermal spray deposition of the grit without dulling its edges, the CBN grit is clad with at least one of nickel, MCrAl, MCrAlY and a refractory modified MCrAlY, where M is nickel, iron, cobalt or mixtures thereof. The cladding on the CBN has a thickness of about 10% to about 60% of the CBN particle size. The amount of nickel can also range from about 15% to about 25% of the CBN particle size. The CBN grit particles range in size from about 20 microns to about 150 microns. Grit sizes much smaller or larger are less effective as a grit particle. CBN grit particles in the top abrasive layer may also range in size from about 25 to about 75 microns in the composite matrix. For a 50 micron CBN particle, the Ni thickness can be in the range of about 5 to about 30 microns thick, or more narrowly about 7.5 to about 12.5 microns.

A specific process is used to achieve the friability of the matrix to get the dull grits to fall out and make the coating like a self dressing grinding wheel. Friability is achieved through a combination of weakening the coating structure by increasing the volume fraction of hBN to limit the number of bonds between ceramic particles and by weakening those bonds by depositing cooler particles. For a given hBN fraction, the strength of bonding is limited by depositing droplets and partially melted particles that have very little superheat above the melting point. This results in a weak bonding between splats. To achieve this weak bonding between particles, a spray process is used. In one method a long torch to work distance may be used to allow sprayed particles to begin resolidifying before deposition, or, in another method, a low temperature (relative to conventional plasma) heat source is used to just barely heat the particles enough to melt and adhere to the surface. This may be achieved using low energy plasma sources or combustion flame spray methods.

Top abrasive layer 66 is applied with a Sulzer Metco 6P flame spray torch setup that includes a 6P7CD nozzle and a 6P-3 torch cooling air cap. Process gasses are set in flow meter readings as follow: Acetylene 36% of flow meter maximum. Oxygen, 32% of flow meter maximum. Torch cooling air, 55% of maximum pressure. Aluminum oxide powder is fed at 17 g/min. Argon carrier gas, 25% of maximum pressure. The torch to part distance is 4.25 inches. The part is set on a turntable and rotated to achieve a surface speed of 120 feet per minute with an axial motion per revolution of the part of 0.66 inches. Preheat is performed by using the spray parameters with no powder flowing to achieve a part temperature of 800° F. (427° C.)+/−100° F. (38° C.) for nickel based parts.

The abrasive layer cuts vane tips in a low temperature abrasive manner much like a metal matrix diamond grinding wheel functions. When the CBN grit particles are dulled by excessive use, they are pulled out by the grinding forces and fresh grits are exposed by wear of the matrix. The grits are held in the matrix and cut the vane tips until the grinding forces pull them out to expose fresh grits.

During slow interactions between CBN grits in the matrix and the vanes during low speed operation, cutting forces are low and little rotor coating wear occurs. When the interaction rates increase, and/or the CBN grits no longer cut as well due to increased surface temperatures or dulling, the strength of the matrix is exceeded and the grits fall out. This shedding of overstressed grit exposes fresh ceramic matrix and CBN grit during vane tip contact and results in abradable wear.

Through the balancing of matrix strength and grit content, a balance is achieved between the needs of the engine to round up parts for optimum efficiency, while providing abradable response during high interaction rate events such as take-off, landing and maneuver loading during surges and the like. The composite ceramic matrix has a strength only sufficient to hold and retain sharp CBN grits that cut with low cutting forces. When the grits dull, forces go up and the grits are released from the matrix, exposing fresh matrix material and grit material.

Figure 4:
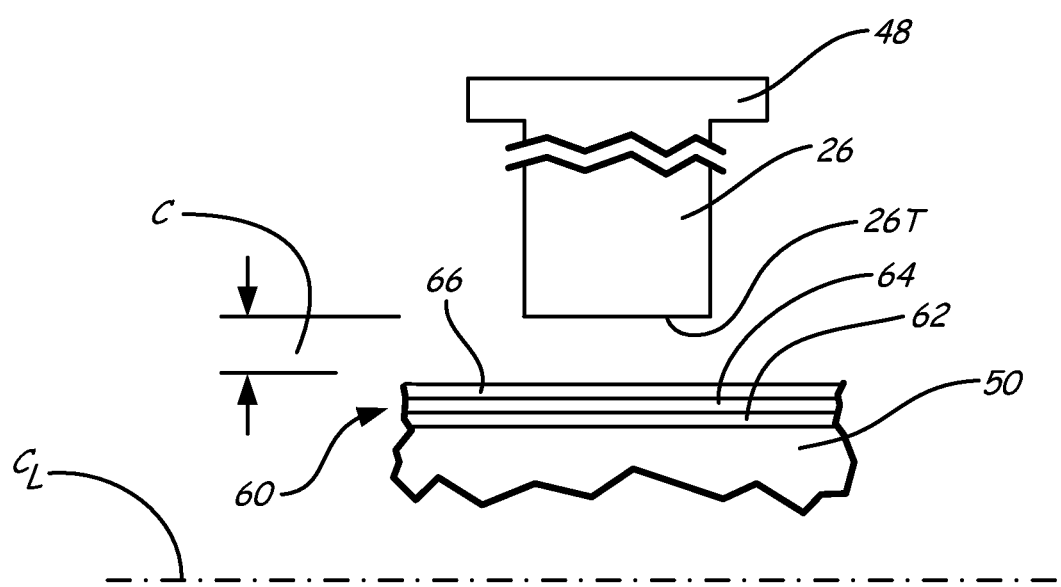
FIG. 4 is a cross sectional view of another embodiment.

Abrasive layer 66 may also be deposited on an intermediate thermally insulating layer to further protect the rotor shaft from burn through during excessive vane contact. FIG. 4 shows an embodiment comprising tri-layer coating 60, which includes intermediate insulating ceramic layer 64 between top abrasive layer 66 and bottom coat layer 62.

Optional ceramic layer 64, shown in FIG. 4, may be any of the zirconia based ceramics such as are described in U.S. Pat. Nos. 4,861,618, 5,879,573, 6,102,656 and 6,358,002 which are incorporated by reference herein in their entirety. Zirconia stabilized with 6-8 wt. % yttria is one example of such a ceramic layer 64. Other examples are zirconia stabilized with ceria, magnesia, calcia, mullite and mixtures thereof. Optional thermally insulated ceramic layer 64 thickness may range from about 7 mils to about 12 mils (about 178 to about 305 microns). In many instances, there is no need for optional thermally insulating ceramic layer 64 because abrasive coating 66 functions to remove material by low temperature abrasion minimizing or eliminating thermal burn through of the rotor in high interaction rate events.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An abrasive coating for a rotor shaft, the abrasive coating comprising:
a metal bond coat layer on the rotor shaft; and
an abrasive layer over the bond layer for contact with vanes during operation of the rotor shaft, the abrasive coating including a plurality of cubic boron nitride (CBN) grit particles in a matrix containing hexagonal boron nitride (hBN), wherein the abrasive coating is weakened by increasing the volume fraction of hBN to weaken bonding between splats of the abrasive coating such that the matrix is configured with weakly bonded splats which are friable during use such that splats with dull CBN grit particles fall out of the matrix exposing fresh splats with sharp CBN grit particles.

2. The abrasive coating of claim 1, wherein the metal bond coat layer ranges in thickness from about 3 mils to about 7 mils (about 76 to about 178 microns).

3. The abrasive coating of claim 1, wherein the metal bond coat layer is formed of at least one of MCrAl, MCrAlY and a refractory modified MCrAlY, where M is nickel, iron, cobalt or mixtures thereof.

4. The abrasive coating of claim 1, wherein the plurality of CBN grit particles are coated with at least one of nickel, MCrAl, MCrAlY and a refractory modified MCrAlY, where M is nickel, iron, cobalt or mixtures thereof prior to placement in the matrix.

5. The abrasive coating of claim 4, wherein the matrix containing hBN also includes yttria stabilized zirconia or gadolinia-zirconate and the amount of hBN ranges from about 5% to about 60%, based on the volume of the coating.

6. The abrasive coating of claim 5, wherein the abrasive layer is applied by plasma flame spraying or combustion flame spraying on to the metal bond coat.

7. The abrasive coating of claim 1, wherein the abrasive CBN grit particles have a particle size ranging from about 20 microns to about 150 microns.

8. The abrasive coating of claim 1, wherein the abrasive CBN grit coating ranges in thickness from about 3 mils to about 7 mils (about 76 to about 178 microns).

9. The abrasive coating of claim 1, which further includes a ceramic layer between the bond layer and the abrasive layer, the ceramic layer having a thickness ranging from about 7 mils to about 12 mils (about 178 to about 305 microns).

10. An abrasive coating for a rotor shaft, the abrasive coating comprising:
a metal bond coat layer on the rotor shaft ranging in thickness from about 3 mils to about 7 mils (76 to 178 microns); and
an abrasive layer comprising splats of a CBN grit in a matrix containing hexagonal boron nitride (hBN) overlying the metal bond layer for contact with cantilevered vanes during operation of the rotor shaft to form an abradable air seal, the abrasive layer having a thickness from about 3 mils to about 7 mils (about 76 to about 178 microns), and wherein the abrasive coating is weakened by the volume fraction of hBN such that the matrix is configured with weakly bonded splats which are friable during use.

11. The abrasive coating of claim 10, wherein the plurality of CBN grit particles are coated with at least one of nickel, MCrAl, MCrAlY and a refractory modified MCrAlY, where M is nickel, iron, cobalt or mixtures thereof prior to placement in the matrix.

12. The abrasive coating of claim 11, wherein the matrix containing hBN also includes yttria stabilized zirconia or gadolinia-zirconate and the amount of hBN ranges from about 5% to about 60%, based on the volume of the coating.

13. The abrasive coating of claim 12, wherein the abrasive layer is applied by plasma flame spraying or combustion flame spraying on to the metal bond coat.

14. The abrasive coating of claim 10, wherein the abrasive CBN grit particles have a CBN grit particle size ranging from about 20 microns to about 150 microns.

15. The abrasive coating of claim 10, wherein the metal bond coat layer is formed of MCrAlY, where is nickel or cobalt, and the alloying elements are chromium (Cr), aluminum (Al) and yttrium (Y).

16. The abrasive coating of claim 10, which further includes a ceramic layer between the metal bond layer and the CBN grit layer, the ceramic layer having a thickness of from about 7 mils to about 12 mils (about 177.8 to about 304.8 microns).

17. A compressor for a gas turbine engine comprising:
a rotor having a plurality of axially spaced stages of compressor blades attached thereto and extending outward from a rotor shaft;
a plurality of axially spaced stages of cantilevered vanes extending inward toward the rotor shaft for contact with a portion of the rotor shaft; and
an abrasive coating on the portion of the rotor shaft for forming abradable air seals with the cantilevered vanes, wherein the abrasive coating includes a metal bond coat layer on the outer surface, and an abrasive layer comprising CBN grit in a matrix containing hexagonal boron nitride (hBN) over the metal bond layer, wherein the abrasive coating is weakened by the volume fraction of hBN such that the matrix is configured with weak intersplat bonding which makes the abrasive coating friable.

18. The compressor of claim 17, wherein the plurality of CBN grit particles are coated with a least one of nickel, MCrAl, MCrAlY and a refractory modified MCrAlY, where M is nickel, iron, cobalt or mixtures thereof prior to placement in the matrix.

19. The compressor of claim 18, wherein the matrix containing hBN also includes yttria stabilized zirconia or gadolinia-zirconate and the amount of hBN ranges from about 5% to about 60%, based on the volume of the coating.

20. The compressor of claim 19, wherein the abrasive layer is applied by plasma flame spraying or combustion flame spraying on to the metal bond coat.

21. The compressor of claim 17, wherein the abrasive CBN grit layer contacts the vanes to roundup the coating.

22. The compressor of claim 17, wherein the abrasive CBN grit layer ranges in thickness from about 3 mils to about 7 mils (about 76.2 to about 177.8 microns).

23. The compressor of claim 17, wherein the abrasive CBN grit particles have a particle size ranging from about 25 microns to about 75 microns.

24. The compressor of claim 17, which further includes a ceramic layer between the bond layer and the abrasive layer, the ceramic layer having a thickness ranging from about 7 mils to about 12 mils (about 178 to about 305 microns).

25. The abrasive coating of claim 1, wherein sharp CBN grit particles are fresh CBN grit particles which have not been dulled by excessive use and dull CBN grit particles are CBN grit particles which have been dulled by excessive use.

\* \* \* \* \*